United States Patent [19]
Rodeghiero et al.

[11] Patent Number: 5,117,702
[45] Date of Patent: Jun. 2, 1992

[54] POWERSHIFT TRANSMISSION FOR AN AGRICULTURAL TRACTOR

[75] Inventors: Reno A. Rodeghiero, Hudson; Craig A. Puetz, Waterloo; Donald I. Malm, Cedar Falls; Douglas R. Johnson, Waterloo, all of Iowa

[73] Assignee: Deere & Company, Moline, Ill.

[21] Appl. No.: 706,440

[22] Filed: May 28, 1991

[51] Int. Cl.$^5$ ............................................. F16H 3/08
[52] U.S. Cl. ................................... 74/359; 74/360
[58] Field of Search ............... 74/359, 360, 15.63, 74/15.66, 355

[56] References Cited

U.S. PATENT DOCUMENTS

| | | | |
|---|---|---|---|
| 4,549,443 | 10/1985 | White | 74/15.66 X |
| 4,615,240 | 10/1986 | Weiss | 74/350 X |
| 4,676,116 | 6/1987 | Nerstad et al. | 74/360 |
| 4,771,647 | 9/1988 | Stevens | 74/360 X |
| 4,782,714 | 11/1988 | Schletzbaum et al. | 74/360 |
| 4,785,682 | 11/1988 | Nishimura et al. | 74/359 |
| 4,858,495 | 8/1989 | Horsch | 74/359 X |

Primary Examiner—Dirk Wright

[57] ABSTRACT

A sixteen forward speed, four reverse speed transmission is provided having a very high efficiency and excellent shift quality. The gear ratios are selected so that a relatively large ratio spacing is provided between each gear step in the low-speed PTO usage range and in the high-speed transport usage range, while a much smaller gear ratio spacing is provided in the intermediate tillage or field usage range. The gear ratios are selected to minimize the number of clutches being changed to shift from one gear to the next, with minimal speed and momentum differences required inside the transmission during each shift. Just two shifts have a large ratio change, and they are positioned in locations having minimal usage, thereby minimizing operator awareness of these gear ratio spacings. The total number of meshes through the transmission is minimized to provide maximum efficiency.

13 Claims, 6 Drawing Sheets

POWERSHIFT TRANSMISSION FOR AN AGRICULTURAL TRACTOR

BACKGROUND OF THE INVENTION

1. Field of the Invention

The present invention relates to multi-speed gearset transmissions, and in particular, transmissions useful in agricultural tractors.

2. Description of the Related Art

In use, the engine throttle on an agricultural tractor normally is set at a predetermined level, and ground speed is adjusted by changing gears in the transmission. Agricultural tractors therefore require relatively small speed changes between gears (e.g., less than a 1 kilometer per hour difference) during field or tillage use to maintain near constant ground speed at varying loads, or to maintain maximum power output for maximum productivity.

"Gear spacing" is the ratio difference between gears, which produces the change in vehicle speed when the vehicle operator shifts to a different gear. It is common practice for agricultural tractor transmissions to provide approximately equal ratio spacings between all gears. This usually is dictated by the inherent capability of the transmission design. Since both cost and operator acceptance limit the maximum number of gears in a transmission, it is common to compromise between close ratio steps between gears (providing more speeds) and the total speed difference between the first gear and the last gear. Tractors with good field-working gears therefore often have a top speed which is slower than the operator's desired transport speed, or a first gear which is too fast for some operations.

"Shift quality" is the operator's perception of how smoothly a transmission reacts when making a shift. Shift quality is subjectively measured by the operator as a function of acceleration, cab vibrations, and noise or shift clunk. These variables are heavily influenced by two major factors: First, the number of clutch changes made during the shift; second, the gear ratio difference associated with each clutch shifted.

It is common practice in agricultural transmissions to have gear shifts involving three pairs of clutches with at least one clutch having a very large ratio change, resulting in a transmission which does not shift smoothly. These three-clutch shifts most often occur in the tillage range. Since the tillage range is precisely where an operator is most likely to shift frequently (to obtain very close speeds under varying load conditions), this undesirable condition has a high frequency.

Transmission efficiency is influenced primarily by the number of gear meshes carrying the power through a transmission. A common rule of thumb is that each gear mesh consumes 1.5% of the power being transmitted. Current designs of power shift transmissions in agricultural tractors transmit the power through three to seven gear meshes between the engine and the spiral bevel output pinion. This 4.5 to 10% power loss costs the customer additional fuel and requires a larger cooling system than would be required with a more efficient transmission.

SUMMARY OF THE INVENTION

It is the object of the present invention to provide a transmission having highly usable gear spacings. It is a further object of the invention to provide a transmission having a smooth shift quality and a high transmission efficiency.

These objects are achieved according to the present invention by first recognizing that different ranges of speeds require different gear spacings. The operating speed of an agricultural tractor can be divided into three general speed usage ranges:

1. Power take-off (PTO) usage—less than 5 kph.
2. Field (or tillage) usage—5 kph to 15 kph.
3. Transport usage—greater than 15 kph.

The present invention recognizes that the PTO and transport ranges are best served using much larger gear spacings than the field usage gear spacings, preferably about twice as great. The present invention therefore provides a transmission providing relatively close (approximately 13%) gear spacings in the field usage range, and relatively large (approximately 28%) gear spacings in both the PTO and transport ranges. This serves to provide the extra gears where they are needed, in the field usage area, and not where they would be wasted, in the PTO and transport ranges.

The transmission according to the present invention has an input shaft, a countershaft and an output shaft. Four forward and one reverse speed reduction ratios are obtained between the input shaft and the countershaft using spur gear meshes, with an idler gear added to provide the one reverse speed. The forward gear ratio spacings are selected to provide equal incremental changes of about 28% (a ratio of 1.28). Each mesh is independently engaged by an independently controlled clutch, e.g., a hydraulically actuated clutch.

Four range reduction ratios are obtained between the countershaft and the output shaft. Spur gear meshes are used for three of the ratios and each is independently engaged by an independently controlled clutch. A separately engaged planetary gear system is used in series with one of the spur gear ratios to obtain the lowest range gear ratio.

The reduction ratio of the D, or high speed range, is selected to provide the maximum legal and/or desired transport speed with selected engine speeds, tire equipment and axle ratios. Each of the other ratio ranges then is expressed as a function of the D range ratio. The C range ratio (one step down from the D range) is $1.28^4$ times the D range reduction ratio. The B range ratio (one step down from C) is selected to be $1.28^{4.5}$ times the D range reduction ratio. The A range ratio (the lowest) is selected to be $1.28^8$ times the D range reduction ratio.

Preferably, the transmission is provided with optional front wheel drive. This is most easily accomplished by providing a front wheel drive shaft axially aligned with the output shaft, and then selectively connecting it to the output shaft with a clutch.

The transmission also preferably is provided with a park brake to brake the output shaft. Preferably, the planetary carrier of the planetary for the A range is splined to rotate with the output shaft. A park brake then can be provided to brake the planetary carrier. This has the advantage that braking can take place over the relatively large diameter of the planetary carrier.

Shift quality of the transmission is significantly improved over conventional transmissions because:

1. There are no three-clutch shifts required with the transmission according to the present invention.
2. Ten of the fifteen forward speed shifts involve a single clutch change.
3. Three of the fifteen forward speed shifts involve two clutch changes where the ratios of the clutched gear pairs are very close, so that minimal speed and momentum changes inside the transmission are required.

4. The remaining two forward speed shifts involve two clutch changes with wider ratio spacings, but these gear changes occur in locations with very minimal usage. Consequently, the frequency of occurrence of such wide ratio spacing shifts is minimized.

Transmission efficiency is improved in the transmission according to the present invention by structuring the transmission such that only two gear meshes are required to transmit the power from the engine to the spiral pinion in the high usage field and transport ranges. This provides a 1.5 to 7% efficiency advantage over comparable transmissions in general use.

BRIEF DESCRIPTION OF THE DRAWINGS

The invention will be described in greater detail with reference to the accompanying drawings in which.

DETAILED DESCRIPTION OF THE PREFERRED EMBODIMENTS

Figure 1:
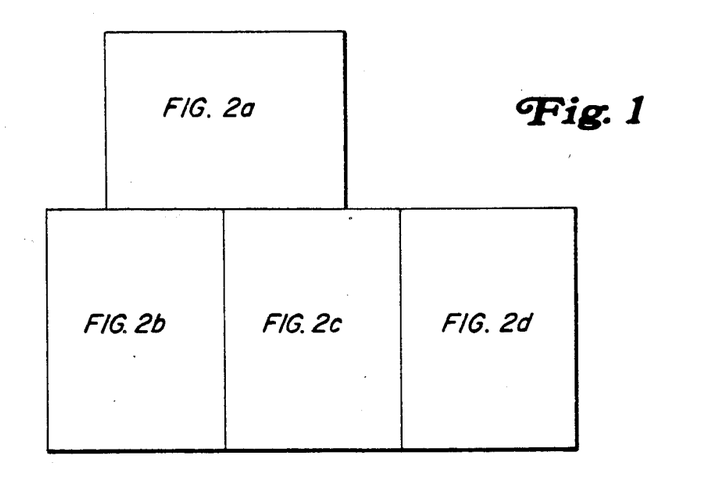
FIG. 1 is a schematic illustration showing the arrangement of FIGS. 2a, 2b, 2c and 2d.
Figure 2A:
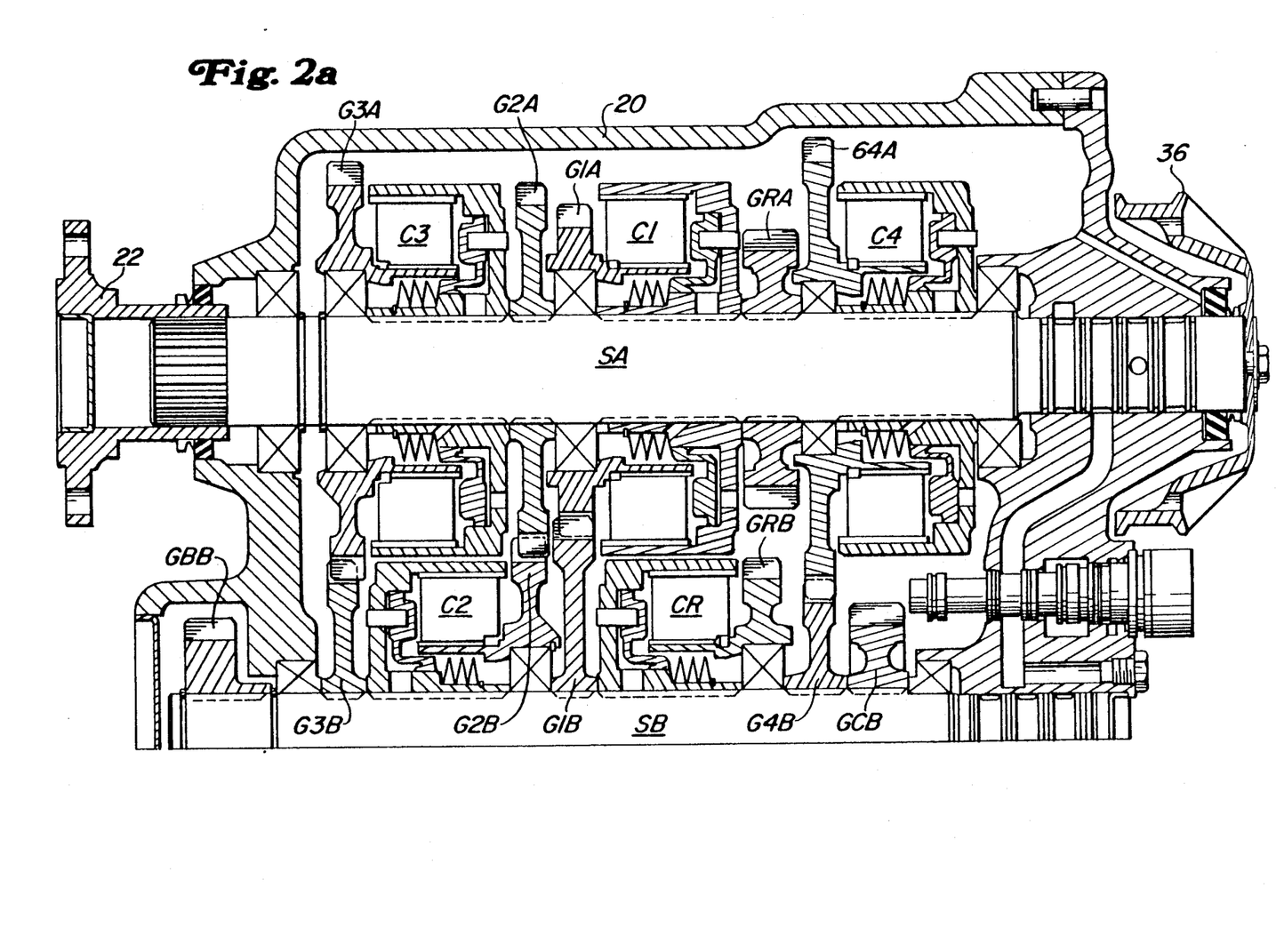
FIGS. 2a, 2b, 2c and 2d (hereinafter referred to collectively as "FIG. 2") illustrate a cross-section of a transmission according to the present invention.
Figure 2B:
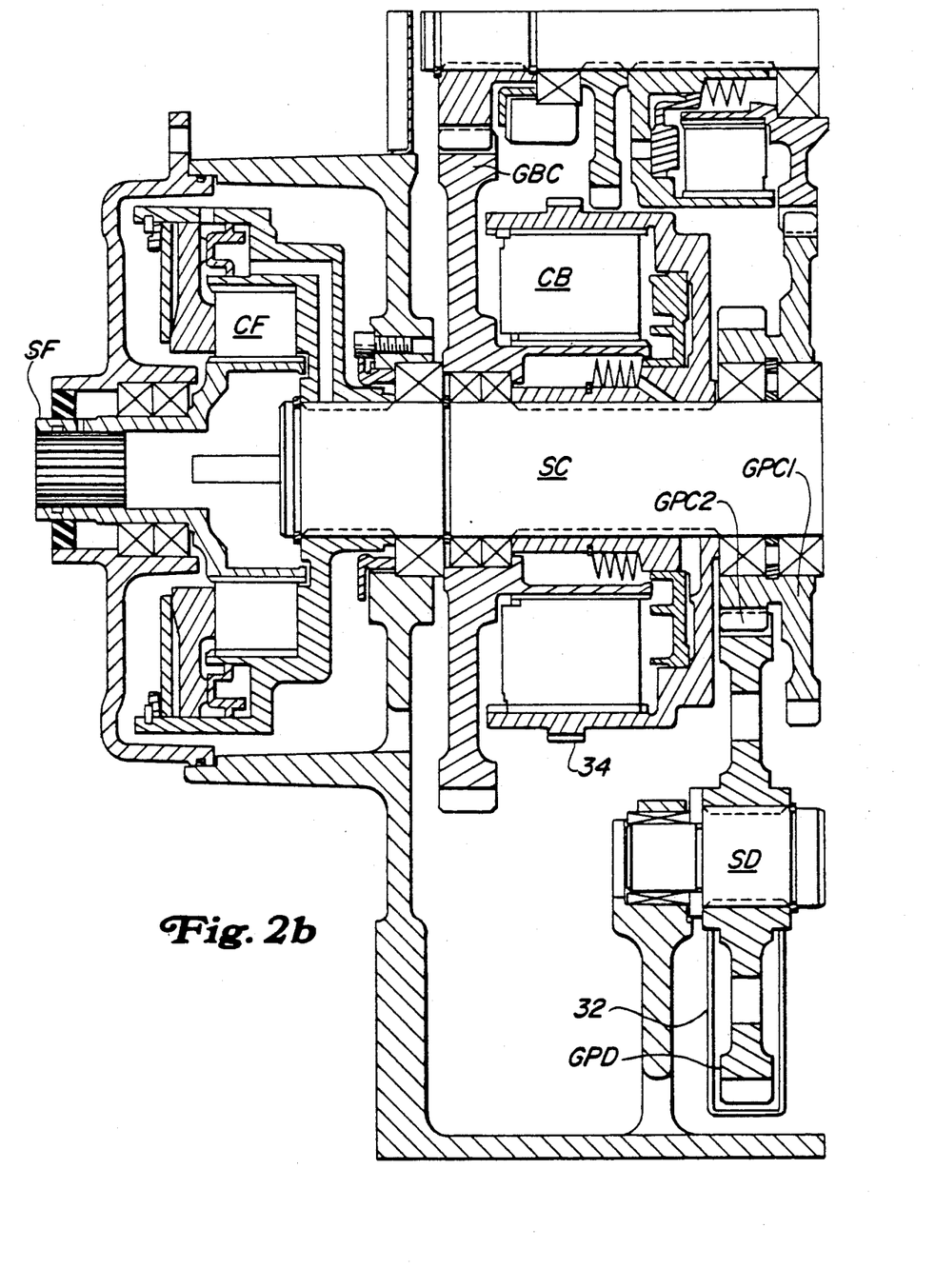
Figure 2C:
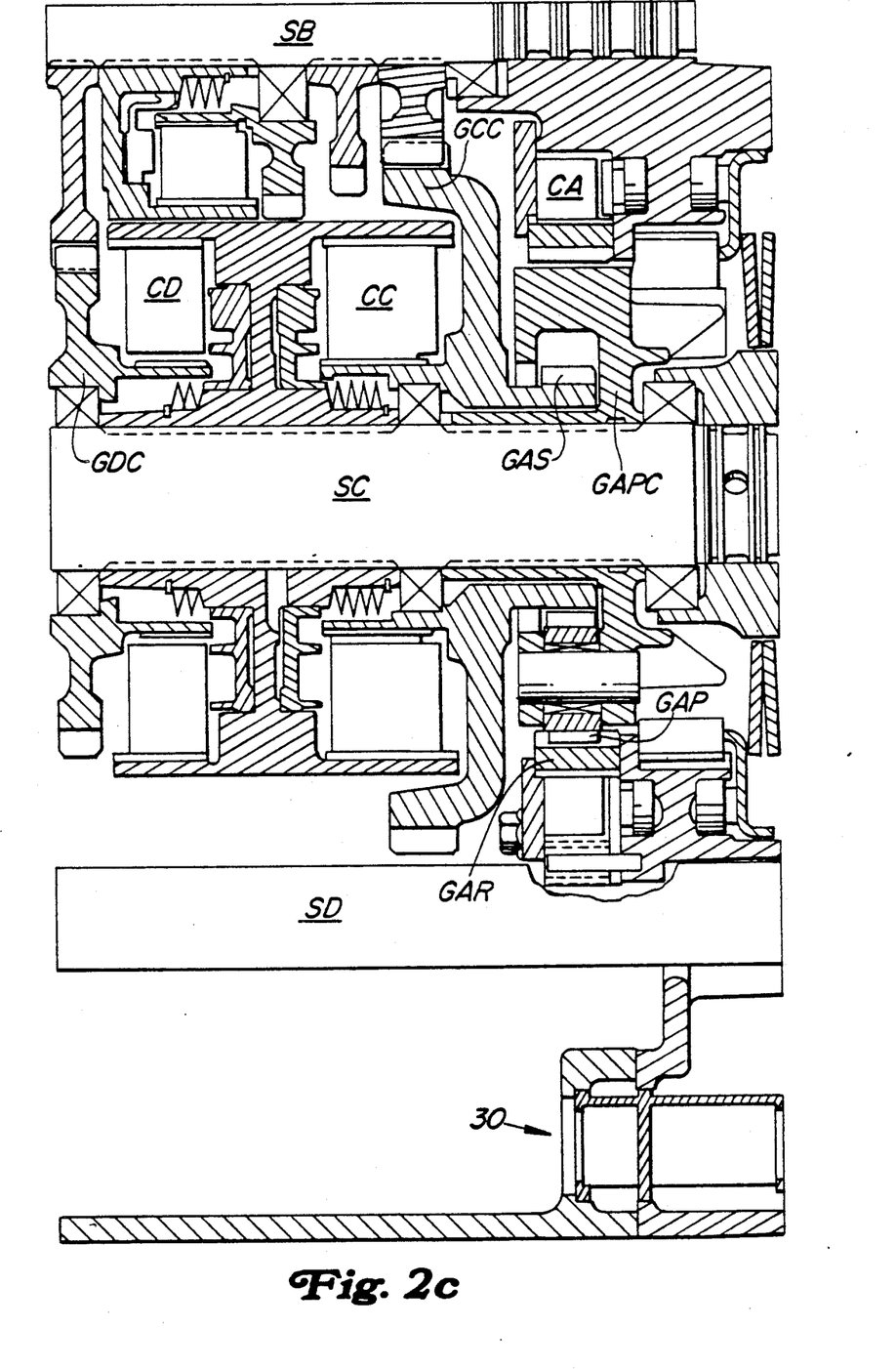
Figure 2D:
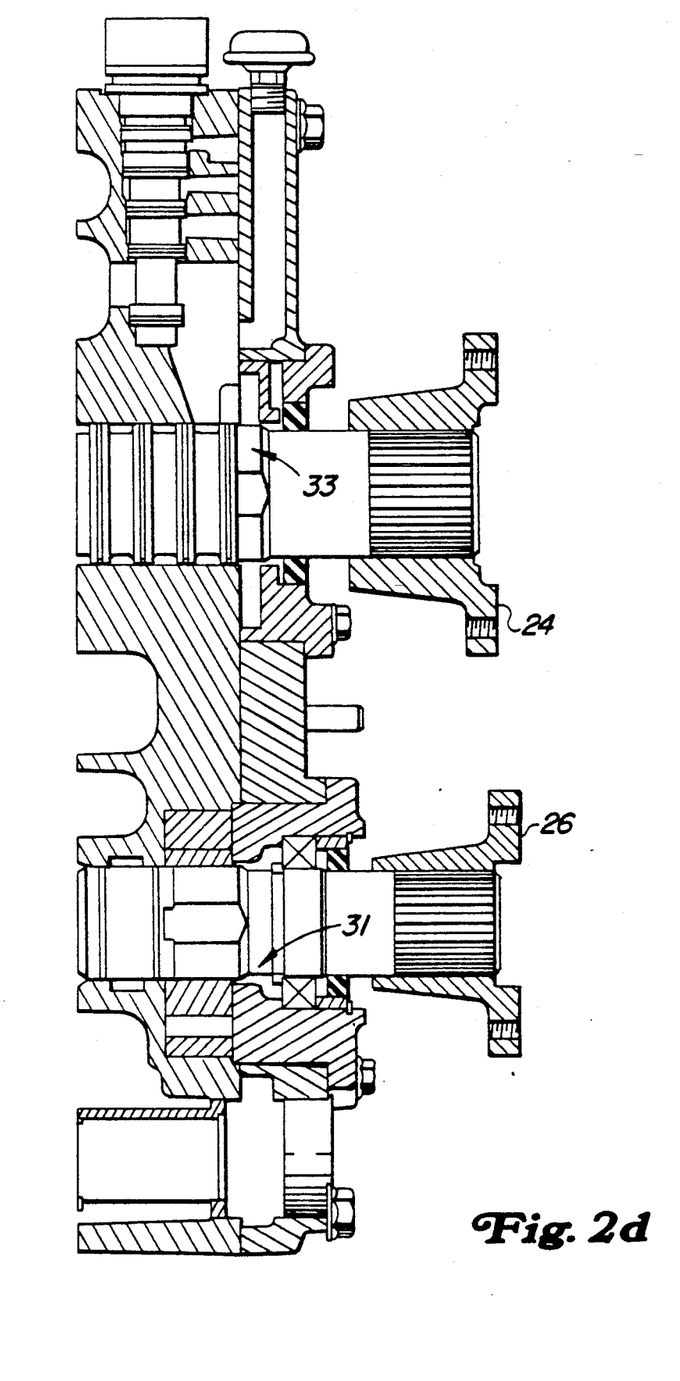

In the following discussion, it will be assumed that the reader has organized FIGS. 2a, 2b, 2c and 2d in the fashion indicated in FIG. 1, and they will collectively be referred to hereinafter as FIG. 2.

For clarity in the following discussion, the various shafts in the invention have been labeled with numerals beginning with the letter S, e.g., SA, SB, SC. Similarly, the clutches have been labeled with reference numerals beginning with the letter C and then the number or letter of the clutch, e.g., C1, C2, CR, CD. Gears have been labeled with reference numerals beginning with the letter G, followed by the number or letter of the clutch which controls engagement of the gear, and the letter of the shaft about which the gear is mounted, e.g., G1A, G1B, GRA. For convenience, these shaft, clutch and gear reference numerals are summarized in Table 1:

TABLE 1

| Shaft | Clutches on Shaft | Gears on Shaft |
|---|---|---|
| SA | C1, C3, C4 | G1A, G2A, G3A, G4A, GRA |
| SB | C2, CR | G1B, G2B, G3B, G4B, GRB, GBB, GCB |
| SC | CA, CB, CC, CD | GBC, GCC, GDC, GPC1, GPC2, GAS, GAP, GAPC, GAR |
| SD | | GPD |
| SF | CF | |
| SI | | GRI |

Input shaft SA is rotatably mounted in a transmission housing 20. An input coupler 22 is splined to or otherwise fixed for rotation with one end of shaft SA for receiving input motive power from a prime mover (not shown), e.g., an engine. Countershaft SB is rotatably mounted in the housing 20 adjacent to input shaft SA. Output shaft SC is rotatably mounted in the housing 20 adjacent to countershaft SB, and PTO shaft SD is rotatably mounted in the housing 20 adjacent to output shaft SC. Output couplers 24 and 26 are provided on output shaft SC and PTO shaft SD to transmit power from the transmission, e.g., to vehicle wheels (not shown) and an implement (not shown), respectively.

Reading from left to right as shown in the drawing, clutches C3, C1 and C4 are mounted to input shaft SA and are independently actuable to fix corresponding gears G3A, G1A and G4A, respectively, for rotation with input shaft SA. Gear G2A is splined to or otherwise fixed for rotation with input shaft SA between clutch C3 and gear G1A. Similarly, gear GRA is fixed for rotation with shaft SA between clutch C1 and gear G4A.

Figure 3:
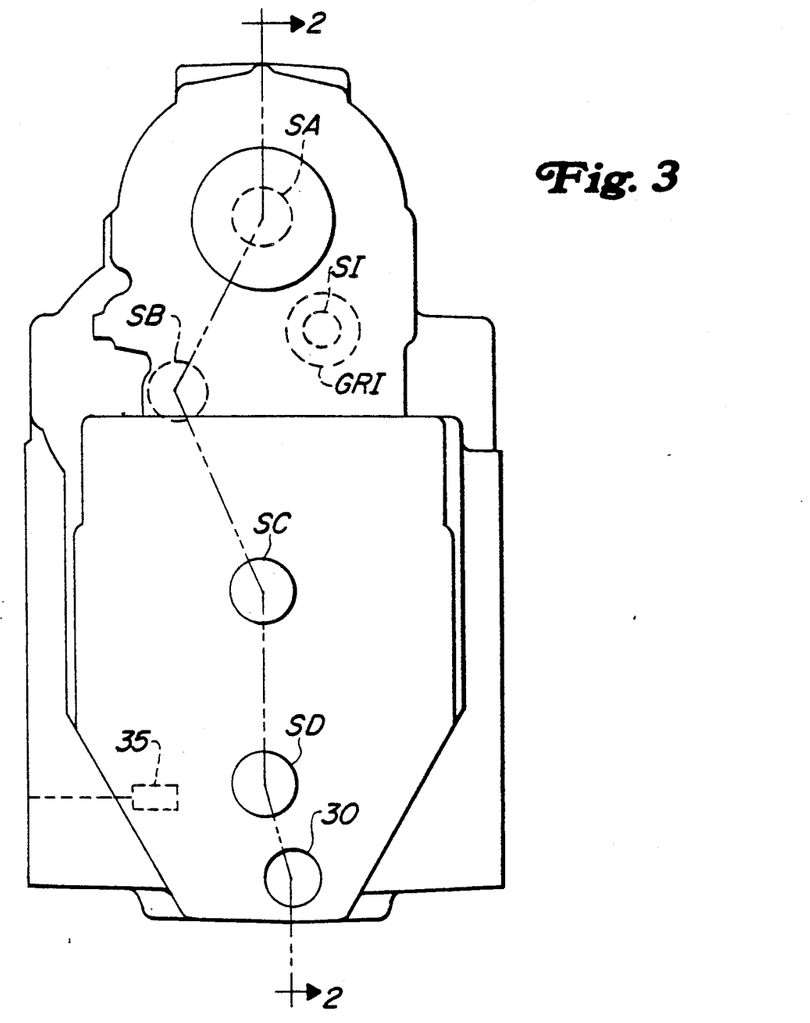
FIG. 3 is a schematic end view of the transmission shown in FIG. 2.

Moving to the countershaft SB, clutches C2 and CR are mounted around countershaft SB and are independently actuable to fix gears G2B and GRB, respectively, for rotation with countershaft SB. Gear G2B continuously meshes with gear G2A. Referring briefly to FIG. 3, a reverse idler gear GRI is mounted on idler shaft SI, which is positioned in the housing adjacent to input shaft SA and countershaft SB. Either idler shaft SI may be rotatably mounted in the housing 20, or reverse idler gear GRI may be rotatably mounted about idler shaft SI. Gear GRA meshes continuously with reverse idler gear GRI, which in turn meshes continuously with gear GRB. Several spur gears are fixed for rotation with countershaft SB, including gears GBB, G3B, G1B, G4B and GCB. Gears G3B, G1B and G4B mesh continuously with gears G3A, G1A and G4A, respectively.

Moving to the output shaft SC, clutches CB, CD and CC are mounted to countershaft SC and are independently actuable to fix gears GBC, GDC and GCC, respectively, for rotation with output shaft SC. Gears GBC, GDC and GCC mesh continuously with gears GBB, G1B and GCB, respectively.

Gear GCC is formed as part of a double gear, the other part of which is a sun gear GAS of a planetary structure shown generally at 28. The planetary carrier GAPC is fixed for rotation with the output shaft SC and carries a plurality of planetary gears GAP which mesh continuously with the sun gear GAS. The planetary carrier GAPC is surrounded by a rotatably mounted ring gear GAR, which meshes continuously with the planetary gears GAP. Clutch CA is independently actuable to fix ring gear GAR against rotation relative to the housing 20.

PTO gears GPC1, GPC2 are formed as a double gear and are rotatably mounted about the output shaft SC. Gear GPC1 meshes continuously with gear G2B, while gear GPC2 meshes continuously with gear GPD, which is fixed for rotation with PTO shaft SD. If selective engagement of the PTO is desired, a suitable clutch (not shown) may be provided in the power train after the output coupler 26.

The various gears preferably are selected to provide a reduction ratio of 1.28 between each of forward speed gear ratios 1 through 4. The D range gear reduction ratio is selected to provide the maximum desired and legal transport speed with selected engine speeds, tire equipment, and axle ratios. The C ratio then is selected to be $1.28^4$ times the D reduction ratio, the B ratio to be $1.28^{4.5}$ times the D ratio, and the A range to be $1.28^8$ times the D ratio. These ratios are the theoretically preferred values. One preferred actual embodiment of the gears would provide them with the tooth counts in Table 2:

TABLE 2

| Gear | Teeth | Gear | Teeth | Gear | Teeth |
|------|-------|------|-------|------|-------|
| G1A | 42 | GRA | 29 | GCB | 34 |
| G1B | 61 | GRI | 46 | GCC | 84 |
| G2A | 49 | GRB | 48 | GDC | 58 |
| G2B | 55 | GAS | 36 | GPC1 | 64 |
| G3A | 55 | GAP | 15 | GPC2 | 38 |
| G3B | 49 | GAR | 66 | GPD | 61 |
| G4A | 61 | GBB | 31 | | |
| G4B | 42 | GBC | 87 | | |

The transmission shown is provided with optional mechanical front-wheel drive via a rotatably mounted front-wheel drive shaft SF which is axially aligned with output shaft SC. Shaft SF is selectively connectible for rotation with the output shaft SC by independently actuable clutch CF.

Parking brake 29 is selectively engageable to fix the planetary carrier GAPC against rotation relative to the housing 20. Since the planetary carrier GAPC is fixed for rotation with the output shaft SC, this effectively brakes the output shaft SC.

The bottom of the transmission housing 20 preferably serves as a sump for lubricating oil for the transmission. A filter 30 and a scavenge pump 31 may conveniently be provided there. A stationary shield 32 preferably is provided surrounding the PTO gear GPD to prevent the gear from churning oil collected in the sump.

Preferably, an emergency pump 33 is driven by the output shaft SC. If the vehicle is in motion, but input to the input coupler 22 has failed, e.g., if the engine has failed, power will be transmitted back into the transmission through output coupler 24. Pump 33 then will provide ground-driven emergency steering fluid and the like.

Preferably, a gear 34 or other similar structure is provided on the outside of the drum of clutch CB, or one of the other clutches on output shaft SC. The drum of clutch CB rotates with the output shaft SC, so that the gear 34 serves as an indication of the output speed of the transmission. A speed sensor 35 (shown schematically in FIG. 3) may conveniently measure the rotational speed of the gear 34 to provide an indication of the speed of the output shaft SC and the vehicle.

If desired, a belt drive pulley 36 can be provided on the end of input shaft SA, or any of the other shafts.

The various clutches and the brake in shown in the drawings are controlled by the usual hydraulic and/or electrical systems. Such control techniques are well known to one of ordinary skill in the art, and therefore will not be discussed further herein. Similarly, bearings, lubrication systems and the like are shown in the drawings. They also are well known, and will not be discussed further herein.

OPERATION

The present transmission will provide 16 forward speeds and 4 reverse speeds upon actuation of the clutches as indicated in Table 3:

TABLE 3

| GR | CLUTCH | RATIO | % CHG | KPH | MPH | NO MESH | SHFTD ELEMS |
|----|--------|-------|-------|-----|-----|---------|-------------|
| 1 | 1(C)A | 10.167 | | 2.23 | 1.39 | 3 | |
| 2 | 2(C)A | 7.857 | 29.4 | 2.89 | 1.79 | 3 | 1 |
| 3 | 3(C)A | 6.236 | 26.0 | 3.64 | 2.26 | 3 | 1 |
| 4 | 4(C)A | 4.820 | 29.4 | 4.71 | 2.92 | 3 | 1 |
| 5 | 1B | 4.076 | 18.2 | 5.57 | 3.46 | 2 | 2 |
| 6 | 1C | 3.588 | 13.6 | 6.32 | 3.93 | 2 | 1 |
| 7 | 2B | 3.150 | 13.9 | 7.20 | 4.47 | 2 | 2 |
| 8 | 2C | 2.773 | 13.6 | 8.18 | 5.08 | 2 | 1 |
| 9 | 3B | 2.500 | 10.9 | 9.07 | 5.64 | 2 | 2 |
| 10 | 3C | 2.201 | 13.6 | 10.31 | 6.40 | 2 | 1 |
| 11 | 4B | 1.932 | 13.9 | 11.74 | 7.29 | 2 | 2 |
| 12 | 4C | 1.701 | 13.6 | 13.33 | 8.29 | 2 | 1 |
| 13 | 1D | 1.381 | 23.2 | 16.43 | 10.21 | 2 | 2 |
| 14 | 2D | 1.067 | 29.4 | 21.25 | 13.21 | 2 | 1 |
| 15 | 3D | .847 | 26.0 | 26.78 | 16.64 | 2 | 1 |
| 16 | 4D | .655 | 29.4 | 34.65 | 21.53 | 2 | 1 |
| R1 | R(C)A | −11.586 | | −1.96 | −1.22 | 4 | |
| R2 | RB | −4.645 | 149.4 | −4.88 | −3.03 | 3 | 1 |
| R3 | RC | −4.089 | 13.6 | −5.55 | −3.45 | 3 | 1 |
| R4 | RD | −1.574 | 159.8 | −14.41 | −8.96 | 3 | 2 |

Operator selection of the gear indicted by the numbers under "GR" results in actuation of the clutches indicated under "Clutch" in Table 32. The transmission then will produce a final reduction ratio between the input coupler 22 and the output coupler 24 as shown under the column "Ratio". The value under "%Chg" is the percent change between a gear ratio and the immediately preceding gear ratio. The numbers under KPH and MPH indicate the resultant speed of the vehicle in kilometers per hour and miles per hour, respectively, assuming that the engine throttle is set to produce an engine speed of 2100 rpm, that the tires have a rolling radius of approximately 93.7 cm, and that the reduction ratio of all components (e.g., the differential and final drive) between the output coupler 24 and the final tire hub is about 33.75. The number under "No Mesh" indicates the number of gear meshes between the input coupler 22 and the output coupler 24 when the transmission is in the indicated gear. The number under "Shftd Elems" indicates how many clutches must be changed to shift into the indicated gear from the next lower gear.

Figure 4:
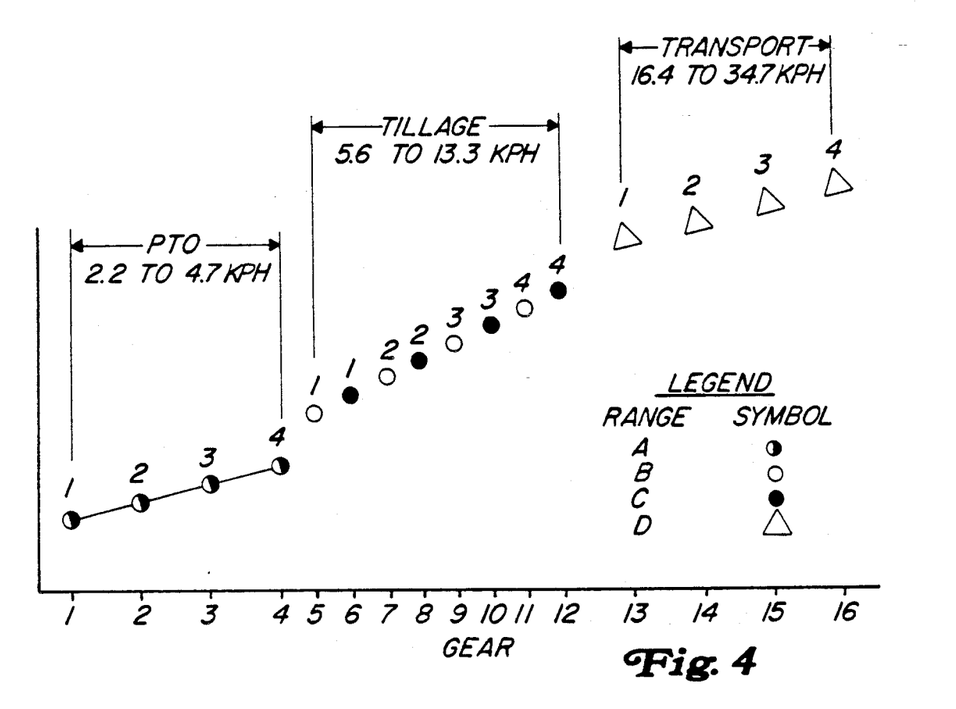
FIG. 4 is a graphic illustration of the ground speeds produced by the various gear ratios of the transmission of FIG. 2.

FIG. 4 graphically illustrates the transmission ratios and resultant speeds of each gear. As may be seen, the gears fall into three distinct ranges, namely, PTO usage, field or tillage usage, and transport usage. Large gear ratio spacings are provided in the PTO and transport ranges, while a high concentration of closely spaced gear ratios is provided in the tillage region, where it is needed. However, it should be noted that due to the low speed in the PTO usage range, even a large ratio spacing produces an actual ground speed change of just 0.6 to 1.0 kph. It also is apparent from the graph that the interleaving of the B and C ranges means that they act as if they form a single range with eight gears, rather than two subsidiary ranges with four gears.

Table 3 indicates that there are five forward speed shifts which require two clutch changes. Two of these shifts (from gears 4 and 12 to gears 5 and 13, respectively) have relatively large gear ratio spacings. The graph in FIG. 4 shows that these shifts are the shifts between the PTO and tillage usage ranges, and between the tillage and transport usage ranges. Since it is unusual to use these shifts in normal operation, the relatively lower shift quality associated with them will almost never be felt.

The remaining two clutch forward speed shifts all fall within the tillage usage range, and therefore will be used regularly. However, the speed/momentum differences inside the transmission between these shifts is very small, so that shift quality will still be high.

It will be readily apparent to one of ordinary skill in the art that numerous modifications could be made to the present transmission. For example, particular tooth counts have been mentioned merely by way of example. Numerous other counts could be selected having similar end results. Likewise, while the transmission has been shown having gear ratios approximately on the order of 28% in two of the ranges and 13% in the middle range, these proportions could easily be adjusted, depending on the particular application. The transmission also has been shown using a planetary structure to achieve a very high reduction ratio for range A. Spur gears or the like could be used if a smaller reduction ratio were acceptable.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A transmission comprising:
   a. a housing having first, second and third shafts rotatably mounted therein substantially parallel to one another, at least said first and third shafts being adapted to transmit power into and out of said housing;
   b. first, second and third gears rotatably mounted about said first shaft, and fourth and fifth gears fixed for rotation with said first shaft;
   c. first, second and third clutches mounted to said first shaft for fixing said first, second and third gears, respectively, for rotation with said first shaft;
   d. sixth and seventh gears rotatably mounted about said second shaft, and eighth, ninth, tenth, eleventh and twelfth gears fixed for rotation with said second shaft, said sixth, ninth, tenth and eleventh gears mashing continuously with said fourth, first, second and third gears, respectively;
   e. fourth and fifth clutches mounted to said second shaft for fixing said sixth and seventh gears, respectively, for rotation with said second shaft;
   f. a reverse idler gear rotatably mounted in said housing adjacent to said first and second shafts, said reverse idler gear meshing continuously with said fifth and seventh gears;
   g. thirteenth, fourteenth and fifteenth gears rotatably mounted about said third shaft, said thirteenth, fourteenth and fifteenth gears meshing continuously with said eighth, tenth and twelfth gears, respectively;
   h. sixth, seventh and eighth clutches mounted to said third shaft, said sixth, seventh and eighth clutches selectively fixing said thirteenth, fourteenth and fifteenth gears for rotation with said third shaft; and
   i. additional gear means for selectively interconnecting said twelfth gear with said third shaft.

2. The transmission of claim 1, wherein said additional gear means comprises:
   a. a sixteenth gear rotatably mounted about said third shaft, said fifteenth and sixteenth gears being formed as a double gear;
   b. a planetary carrier mounted for rotation with said third shaft and having at least one planetary gear rotatably mounted thereon, and a planetary ring gear rotatably mounted about said planetary carrier, said at least one planetary gear meshing continuously with said sixteenth gear and said planetary ring gear;
   c. a ninth clutch mounted to said housing for selectively fixing said planetary ring gear against rotation relative to said housing.

3. The transmission of claim 2, further comprising a park brake for selectively fixing said planetary carrier against rotation relative to said housing.

4. The transmission of claim 2, wherein the gear ratios provided by said gears fall into first, second and third groups, with the ratio spacing in said first and third groups being approximately twice the ratio spacing in said second groups.

5. The transmission of claim 4, wherein said gear ratios are such that the only changes from one gear ratio to the next which involve a large change in momentum inside the transmission are the changes going from said first to said second groups and from said second to said third groups.

6. The transmission of claim 4, wherein changing from one gear ratio t the next requires a change of only one clutch in ten of the possible forward speed changes, and the change of only two clutches in the other possible forward speed changes.

7. The transmission of claim 6, wherein one of said gear ratio changes requiring a change of two clutches is the change from said first to said second groups, and another one is the change from said second to said third groups.

8. The transmission of claim 7, wherein the reduction ratio provided by said fourteenth gear meshing with said tenth gear provides a base reduction ratio, the reduction ratio provided by said fifteenth gear meshing with said twelfth gear is about $1.28^4$ times said base reduction ratio, the reduction ratio provided by said thirteenth gear meshing with said eighth gear is about $1.28^{4.5}$ times aid base reduction ratio, and the reduction ratio provided by the combination of said fifteenth gear meshing with said twelfth gear, said sixteenth gear meshing with said at least one planetary gear and said at least one planetary gear meshing with said ring gear is about $1.28^8$ times said base reduction ratio.

9. The transmission of claim 2, further comprising:
   a. seventeenth and eighteenth gears rotatably mounted to said third shaft, said seventeenth and eighteenth gears being formed as a double gear, and said seventeenth gear meshing continuously with said sixth gear;
b. a fourth shaft rotatably mounted in said housing and adapted to transmit power into and out of said housing;
c. a nineteenth gear fixed for rotation with said fourth shaft and meshing continuously with said eighteenth gear.

10. The transmission of claim 9, wherein the bottom of said housing serves as a sump for lubricating fluid, wherein said fourth shaft and further comprising a scavenge pump driven by said fourth shaft for pumping lubricating fluid from said sump.

11. The transmission of claim 1, further comprising:
a. a front wheel drive shaft rotatably mounted in said housing axially aligned with said third shaft and adapted to transmit power into and out of said housing;
b. a front wheel drive clutch for selectively fixing said front wheel drive shaft for rotation with said third shaft.

12. The transmission of claim 1, wherein said first shaft is an input shaft and said third shaft is an output shaft connected to a set of vehicle wheels, and wherein the transmission further comprises a ground driven emergency pump driven by said third shaft for providing operating fluid under emergency conditions when said vehicle is moving and no input power is being provided to said first shaft.

13. The transmission of claim 1, further comprising:
a. a speed indicating gear formed on an external surface of one of said sixth, seventh or eighth clutches; and
b. a speed sensor for sensing the speed of said speed indicating gear.

* * * * *